United States Patent [19]

Nogami et al.

[11] 4,080,006
[45] Mar. 21, 1978

[54] BRAKING PRESSURE CONTROL VALVE UNIT

[75] Inventors: Tomoyuki Nogami, Toyota; Kiyoshi Nishiwaki, Susono, both of Japan

[73] Assignee: Toyota Jidosha Kogyo Kabushiki Kaisha, Toyota, Japan

[21] Appl. No.: 747,079

[22] Filed: Dec. 3, 1976

[30] Foreign Application Priority Data

May 8, 1976    Japan ................................. 51-52634

[51] Int. Cl.² ........................... B60T 8/14; B60T 8/26
[52] U.S. Cl. ...................................... 303/24 F; 137/38
[58] Field of Search .......................... 188/349; 137/38; 303/24 R, 24 A, 24 F, 6 C

[56] References Cited

U.S. PATENT DOCUMENTS

| | | | |
|---|---|---|---|
| 2,242,297 | 5/1941 | Freeman | 188/349 |
| 3,087,761 | 4/1963 | Stelzer | 303/24 F |
| 3,147,045 | 9/1964 | Stelzer | 303/24 F |
| 3,385,308 | 5/1968 | Farr | 137/38 |
| 3,398,757 | 8/1968 | Milster | 137/38 |

FOREIGN PATENT DOCUMENTS 1,096,330    12/1967    United Kingdom ................ 303/6 C Primary Examiner—George E. A. Halvosa
Attorney, Agent, or Firm—Stevens, Davis, Miller & Mosher

[57] ABSTRACT

An inertia-controlled valve assembly includes a valve seat provided within a valve chamber and a ball disposed within the valve chamber to co-operate with the valve seat and rolling toward the valve seat on the inclined bottom surface of the chamber of which the inclination is varied in accordance with the rate of deceleration of the vehicle. In the inertia-controlled valve assembly, a movable element is slidably disposed within the valve chamber to subdivide the valve chamber into a first chamber receiving the ball therein and a second chamber in communication with an inlet port and provided thereon with an orifice to permit fluid communication between the first and second chambers, whereby in rapid operation of the master cylinder the movable element is moved toward the valve seat by a pressure difference produced between the first and second chambers due to the orifice so that the ball is forcibly moved toward the valve seat to close the valve.

7 Claims, 10 Drawing Figures

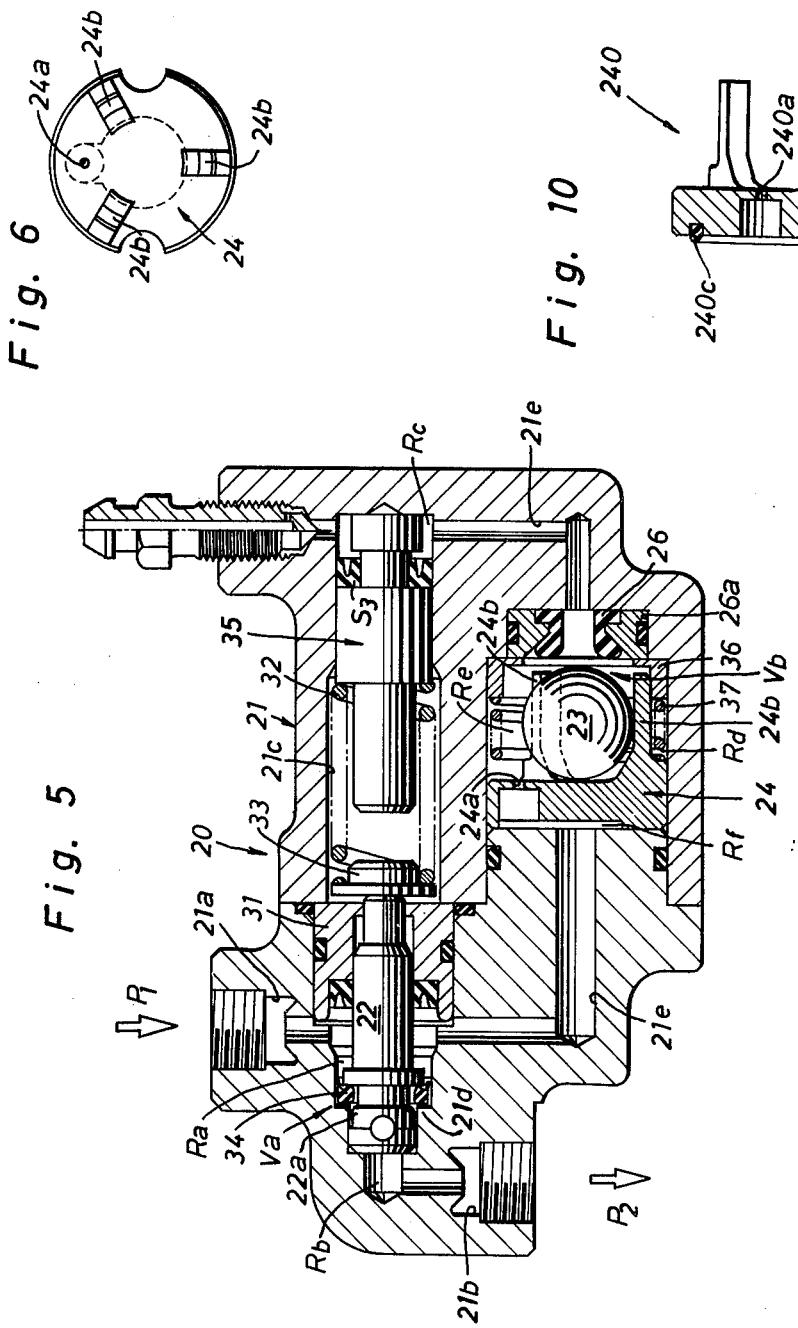

BRAKING PRESSURE CONTROL VALVE UNIT

BACKGROUND OF THE INVENTION

The present invention relates to a fluid pressure control device for a vehicle braking system, and more particularly to a fluid pressure control valve unit of the type in which an inertia-controlled valve assembly is adapted to control the braking pressure applied to rear wheel brake cylinders from a master cylinder in accordance with the rate of deceleration of the vehicle.

The inertia-controlled valve assembly of this kind includes a movable ball disposed within a valve chamber to co-operate with a valve seat and rolling toward the valve seat on the inclined bottom of the chamber. The valve assembly is usually mounted at an inclined angle on a vehicle body frame supported by a suspension system such that the ball rests under gravity in a normal position to open the valve and rolls toward the valve seat to close the valve when the ball is subjected to a deceleration in excess of a predetermined value. In practical use of the valve assembly, if the master cylinder is rapidly operated by emergent depression of the brake pedal, the emergent braking operation causes forward displacement of the vehicle body frame against the spring suspended wheel axles due to the moment of inertia. This decreases the rate of deceleration acting on the ball less than that acting on the wheel axles and subsequently the rolling operation of the ball delays to occur mis-operation of the fluid pressure control device.

SUMMARY OF THE INVENTION

Accordingly, the primary object of the present invention is directed to provide an improved inertia-controlled valve assembly in which the ball is forcibly moved toward the valve seat to effectively close the valve in rapid operation of the master cylinder.

According to the present invention, there is provided an inertia-controlled valve assembly including a valve seat provided within a valve chamber and a ball disposed within the valve chamber to co-operate with the valve seat and rolling toward the valve seat on the inclined bottom surface of the chamber of which the inclination is varied in accordance with the rate of deceleration of the vehicle, wherein a movable element is slidably disposed within the valve chamber to subdivide the valve chamber into a first chamber receiving the ball therein and a second chamber in communication with an inlet port and provided thereon with an orifice to permit fluid communication between the first and second chambers, whereby in rapid operation of the master cylinder the movable element is moved toward the valve seat by a pressure difference produced between the first and second chambers due to the orifice so that the ball is forcibly moved toward the valve seat to close the valve.

BRIEF DESCRIPTION OF THE DRAWINGS

Additional objects and advantages of the present invention will be more readily apparent from the following detailed description of preferred embodiments thereof when taken together with the accompanying drawings in which:

FIG. 5 shows a vertical section of another embodiment of the present invention;

FIG. 6 is a front view of a ball receiver assembled within the valve unit shown in FIG. 5;

FIG. 10 shows a vertical section of a modification of the ball receiver shown in FIG. 5.

DESCRIPTION OF THE PREFERRED EMBODIMENTS

Figure 1:
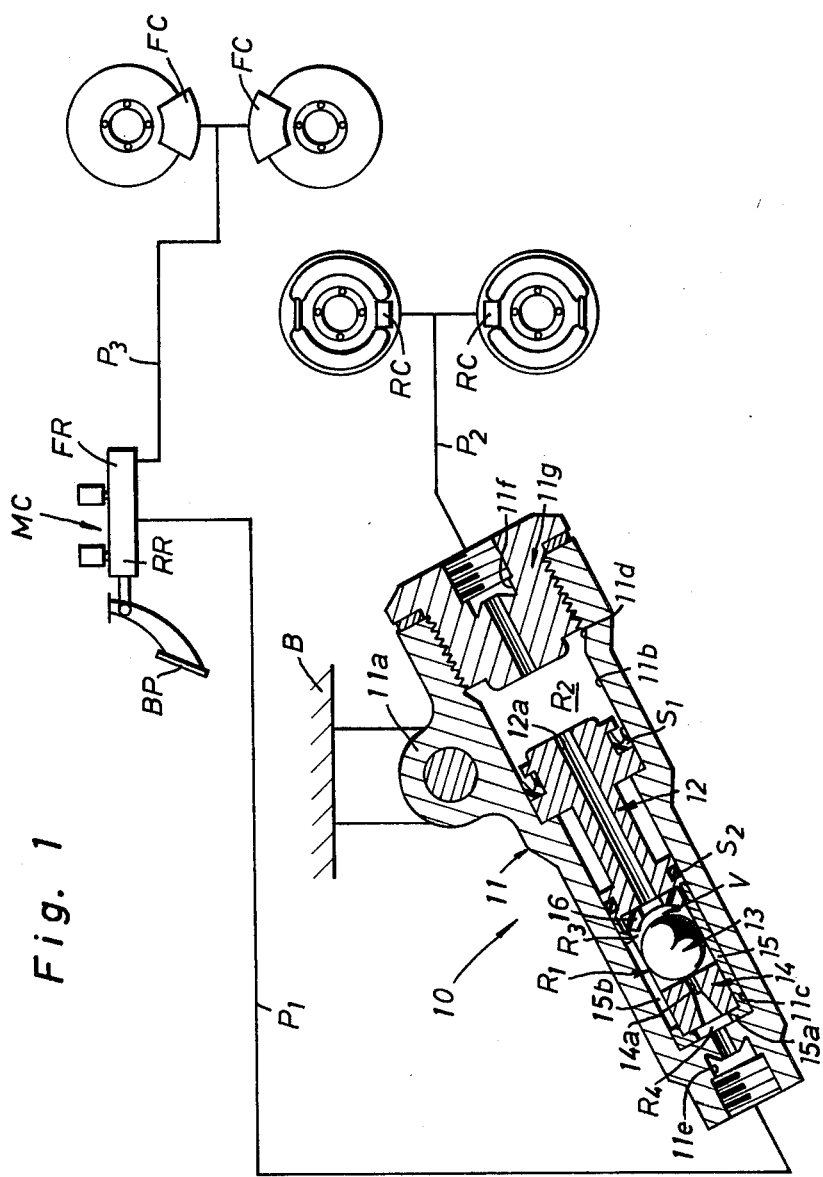
FIG. 1 is a schematic illustration of a vehicle braking system including an inertia-controlled valve unit of the present invention.

Referring now to the accompanying drawings, particularly with reference to FIG. 1, an inertia-controlled valve unit 10 in accordance with the present invention is incorporated between a pipe-line $P_1$ in connection to a rear pressure chamber RR of a tandem master cylinder MC and a pipe-line $P_2$ in connection to the rear wheel cylinders RC of the brakes on the rear wheel of the vehicle. A front pressure chamber FR of the master cylinder MC is directly connected to the front wheel cylinders FC of the brakes on the front wheel of the vehicle by way of a pipe-line $P_3$.

The inertia-controlled valve unit 10 is fixedly mounted on a vehicle body frame B at an inclined angle $\theta$ in relation to the horizontal line. The valve unit 10 comprises a housing 11 which contains therein a stepped piston 12, an inertia-controlled metal ball 13 and a movable spool 14. The housing 11 is provided therein with a stepped cylindrical bore 11b and at the upper portion thereof with a flange 11a where the housing 11 is mounted on the body frame B. An inlet port 11e is provided on the rear end of a small diameter portion 11c of the stepped bore 11b, whereas an outlet port 11f is provided on a plug 11g fluid-tightly threaded into the front end of a large diameter portion 11d of the stepped bore 11b.

The stepped piston 12 is slidably disposed within the stepped bore 11b through annular seal members $S_1$ and $S_2$ to form a first pressure chamber $R_1$ connected to the inlet port 11e and a second pressure chamber $R_2$ connected to the outlet port 11f. The two pressure chambers $R_1$ and $R_2$ are communicated to each other through an axial passage 12a of the stepped piston 12. Fixedly assembled within the small diameter portion 11c of the stepped bore 11b is a sleeve case 15 which is provided at its rear end with an annular shoulder 15a to receive the spool 14 thereon. The sleeve case 15 is also provided at its upper wall with an axial slit 15b to permit flow of the fluid existing between the ball 13 and a valve seat 16 when the ball 13 rolls in the forward direction.

The ball 13 housed within the sleeve case 15 is free to roll forwardly on the inclined bottom of the case 15. This ball 13 co-operates with the annular valve seat 16 secured to the rear end of the stepped piston 12 to provide a cut-off valve V which functions to interrupt fluid communication between the first and second pressure chambers $R_1$ and $R_2$. The ball 13 normally rests under gravity in the position shown in the figure to open the cut-off valve V. When the rate of deceleration caused by application of the brakes exceeds a predetermined value $g_1$, the ball 13 will move into engagement with the valve seat 16 due to the inertia forces acting thereon to close the cut-off valve V.

The spool 14 is slidably disposed within the sleeve case 15 to subdivide the first pressure chamber $R_1$ into a front chamber $R_3$ and a rear chamber $R_4$. The spool 14 is provided at its center with an orifice 14a to permit flow of the fluid from the rear chamber $R_4$ to the front chamber $R_3$.

Hereinafter the function of the inertia-controlled valve unit 10 will be described in detail. While the vehicle is under the unloaded condition, normal depression of the brake pedal BP produces braking pressure in the front and rear pressure chambers FR and RR of the master cylinder MC. The master cylinder pressure exerted in the front chamber FR is directly applied to the front wheel cylinders FC through the pipe-line $P_3$. On the other hand, the master cylinder pressure exerted in the rear chamber RR is applied to the inlet port 11e of the valve unit 10 through the pipe-line $P_1$. Within the valve unit 10, the pressurized fluid flows into the second pressure chamber $R_2$ across the rear chamber $R_4$, the orifice 14a of the spool 14, the front chamber $R_3$, the cut-off valve V and the axial passage 12a of the piston 12 in sequence, and subsequently is supplied into the rear wheel cylinders RC through the outlet port 11f and the pipe-line $P_2$. Thus, the front and rear wheel cylinders FC and RC are actuated to operate the brakes in response to the value of the master cylinder pressure Pm. In this stage, the rate of deceleration g acting on the ball 13 increases in value in response to the increase of the master cylinder pressure Pm as shown by a solid line I in FIG. 2, since the vehicle body frame B makes little forward movement against the spring suspended axles and the spool 14 rests in the position.

When the master cylinder pressure Pm reaches a value $Pm_1$ to increase the rate of deceleration g acting on the ball 13 to the predetermined value $g_1$, the ball 13 rolls forwardly and moves into engagement with the valve seat 16 to close the cut-off valve V to interrupt fluid communication between the first and second pressure chambers $R_1$ and $R_2$. If the master cylinder pressure Pm is further increased by continued depression of the brake pedal BP, the stepped piston 12 moves forwardly so that the pressure Pw applied to the rear wheel cylinders RC will increase as shown by a solid line IV in FIG. 3. In this instance, the ball 13 is seated on the valve seat 16 by the inertia thereof and the pressure difference between the first and second pressure chambers $R_1$ and $R_2$ and the spool 14 rests under gravity in the position.

Under the unloaded condition of the vehicle, if the master cylinder pressure Pm is rapidly increased by emergent depression of the brake pedal BP, the braking operation will shift part of the weight of the vehicle at the rear axle to the front axle due to the moment of inertia. This causes forward displacement of the vehicle body frame B and the rate of deceleration g acting on the ball 13 decreases as shown by a dot-dash line II in FIG. 2.

Figure 4:
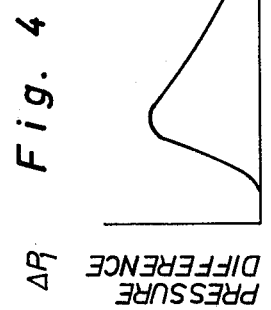
FIG. 4 is a graph showing a pressure difference produced within the valve unit in rapid operation of the master cylinder shown in FIG. 1.

During the rapid increase of the master cylinder pressure, a pressure difference $\Delta P_1$ is temporarily produced between the rear and front pressure chambers $R_4$ and $R_3$ as shown in FIG. 4. Thus, the spool 14 is moved forwardly by the pressure difference $\Delta P_1$ to move the ball 13 forwardly. As a result, the rate of deceleration g acting on the ball 13 is compensated as shown by a dotted line III in FIG. 2. In this instance, when the master cylinder pressure Pm reaches the value $Pm_1$, the ball 13 is seated on the valve seat 16 to close the cut-off valve V. Other operations are the same as those in the normal braking operation and no repetition is made here.

Figure 2:
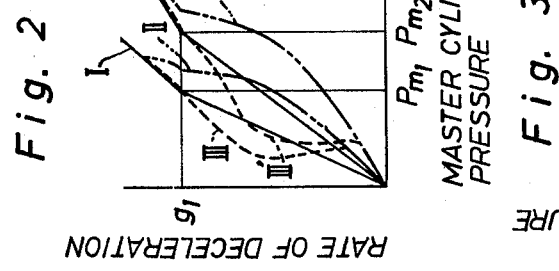
FIG. 2 is a graph showing a relation between the master cylinder pressure and the rate of deceleration acting on the ball assembled within the valve unit.
Figure 3:
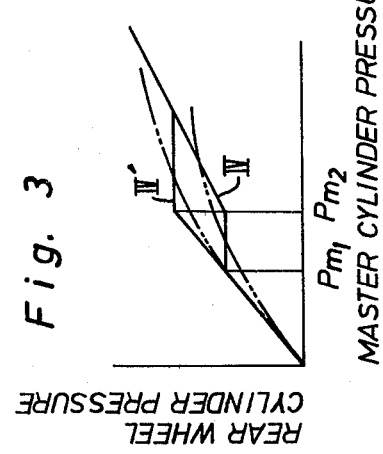
FIG. 3 is a graph showing the pressure controlling characteristics of the valve unit shown in FIG. 1.

Furthermore, the function of the inertia-controlled valve unit 10 under the loaded condition of the vehicle is substantially as same as that of the case where the vehicle is under the unloaded condition and will apparently be recognized when referred to a solid line I', a dot-dash line II' and a dotted line III' in FIG. 2 and also a solid line IV' in FIG. 3. In FIGS. 2 and 3 reference character $Pm_2$ indicates a master cylinder pressure when the rate of deceleration g of the ball 13 reaches the predetermined value $g_1$ while the vehicle is under the loaded condition.

FIGS. 5 and 6 illustrate another embodiment of the present invention. In these figures, an inertia-controlled valve unit 20 is adapted to be fixedly mounted on the vehicle body frame B at an inclined angle $\theta$ in relation to the horizontal line. The valve unit 20 comprises a housing 21 in which a stepped piston 22, an inertia-controlled ball 23 and a movable receiver 24 are assembled. The housing 21 is provided thereon with an inlet port 21a for connection to the rear pressure chamber RR of the master cylinder MC by way of the pipe-line $P_1$ and with an outlet port 21b for connection to the rear wheel cylinders RC through the pipe-line $P_2$. The housing 21 is further provided therein with a stepped cylindrical bore 21c in communication with the inlet and outlet ports 21a and 21b.

The stepped piston 22 is slidably disposed within the rear portion of the stepped bore 21c for axial reciprocation and received by a sleeve 31, fixedly assembled within the stepped bore 21c through an annular seal member. The stepped piston 22 has piston surfaces providing first and second effective piston areas whereby opposing displacement forces may be provided on the piston respectively in the directions toward the outlet port 21b and away from the outlet port by the hydraulic pressure acting on the piston surfaces. The first effective piston area is smaller than the second effective piston area so that the resultant force on the piston 22 due solely to the hydraulic pressure in the valve unit 20 is forward.

The stepped piston 22 is provided thereon with an annular valve part 22a co-operable with an annular valve seat 34 secured to an inner shoulder 21d of the bore 21. Thus, a control valve Va is provided by the valve part 22a and the valve seat 34 for controlling fluid communication between first and second pressure chambers Ra and Rb in accordance with the reciprocation of the piston 22 within the stepped bore 21c, provided by the hydraulic pressure acting on the effective surface area difference of the piston 22 and opposing a resilient force of a compression spring 32. The compression spring 32 is engaged at one end thereof with the front end of the piston 22 through a retainer 33 and at the other end thereof with as assistant plunger 35 to bias the piston 22 into a normal position in which the valve part 22a and the valve seat 34 provide full communication between the chambers Ra and Rb. The assistant plunger 35 is slidably disposed within the forward portion of the stepped bore 21c through an annular seal cup $S_3$ to form a third pressure chamber $Rc$ and is biased forwardly by the compression spring 32.

The movable receiver 24 is slidably disposed within a fourth pressure chamber $Rd$ which is provided within a communication passage 21e connecting the first pressure chamber $Ra$ to the third pressure chamber $Rc$. The fourth chamber $Rd$ is subdivided by the receiver 24 into a front pressure chamber $Re$ and a rear pressure chamber $Rf$. The receiver 24 is provided at the upper portion thereof with an orifice 24a to allow flow of the fluid between the front and rear chambers $Re$ and $Rf$ and biased rearwardly by a compression spring 37 of which one end is fixed on the housing 21 by way of an annular retainer 36. As shown in FIG. 6, the receiver 24 has three guide arms 24b to receive the ball 23 thereon.

The ball 23 is free to roll forwardly on the inclined guide arms 24b so as to conduct opening and closing operation against an annular valve seat 26 disposed within a stepped bore 26a located in the communication passage 21e. Thus, the ball 23 and the valve seat 26 provide a cut-off valve $Vb$ which functions to interrupt fluid communication between the third and fourth chambers $Rc$ and $Rd$. The ball 23 normally rests under gravity in the position shown in FIG. 5 to open the cut-off valve $Vb$ and will move into engagement with the valve seat 26 due to the inertia force acting thereon to close the cut-off valve $Vb$.

In operation of the inertia-controlled valve unit 20, when the brake pedal BP is normally depressed under the unloaded condition of the vehicle to actuate the master cylinder MC, the hydraulic pressure exerted in the front chamber FR of the master cylinder MC is directly applied to the front wheel cylinders FC through the pipe-line $P_3$, whereas the hydraulic pressure exerted in the rear chamber RR is applied into the inlet port 21a of the valve unit 20 through the pipe-line $P_1$. Within the valve unit 20, the pressurized fluid flows into the rear wheel cylinders RC across the first and second pressure chambers $Ra$ and $Rb$, the outlet port 21b and the pipe-line $P_2$ and also flows into the third pressure chamber $Rc$ through the communication passage 21e and the fourth chamber $Rd$. Thus, the front and rear wheel cylinders FC and RC are actuated to operate the brakes in response to the value of the master cylinder pressure $Pm$. In this stage, the rate of deceleration $g$ acting on the ball 23 increases in value in response to the increase of the master cylinder pressure $Pm$ as shown by a solid line V in FIG. 7, since the vehicle body frame B makes little forward movement against the spring suspended axles and the ball receiver 24 rests in the position. Further, in this stage, the assistant plunger 35 in the housing 21 is moved rearwardly by the pressure in the third chamber $Rc$ against the resilient force of the spring 32 and the stepped piston 22 is urged forwardly by the pressure in the second pressure chamber $Rb$. Then, the assistant plunger 35 will stop where the pressure in the third chamber $Rc$ is balanced with the resilient force of the spring 32.

When the master cylinder pressure $Pm$ reaches a value $Pm_3$ to increase the rate of deceleration $g$ of the ball 23 to the predetermined value $g_2$, the ball 23 rolls forwardly and moves into engagement with the valve seat 26 to close the cut-off valve $Vb$ to interrupt fluid communication between the first and third chambers $Ra$ and $Rc$. Then, the pressure in the third chamber $Rc$ is maintained at a constant value and the resilient force of the spring 32 compressed by the rearward movement of the assistant plunger 35 is maintained at a constant value. If the master cylinder pressure $Pm$ is further increased by continued depression of the brake pedal BP, the stepped piston 22 moves forwardly by the hydraulic pressure acting on the effective surface area difference of the piston 22 and opposing the resilient force of the spring 32 to close the control valve $Va$. Subsequently, opening and closing operation of the control valve $Va$ is conducted in accordance with the reciprocation of the piston 22 so that the pressure $Pw$ applied to the rear wheel cylinders RC will increase as shown by a solid line VIII in FIG. 8. In this instance, the ball 23 is seated on the valve seat 26 by the inertia thereof and the pressure difference between the first and third chambers $Ra$ and $Rc$ and the ball receiver 24 rests in the position due to the biasing force of the spring 37.

Figure 9:
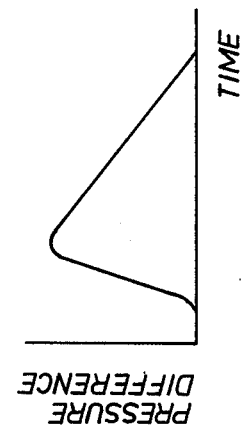
FIG. 9 is a graph showing a pressure difference produced within the valve unit in rapid operation of the master cylinder shown in FIG. 5.

Under the unloaded condition of the vehicle, if the master cylinder pressure $Pm$ is rapidly increased by emergent depression of the brake pedal BP, the braking operation will shift part of the weight of the vehicle at the rear axle to the front axle due to the moment of inertia. This causes forward displacement of the vehicle body frame B and the rate of deceleration $g$ acting on the ball 23 decreases as shown by a dot-dash line VI in FIG. 7. In this instance, a pressure difference $\Delta P_2$ is temporarily produced between the rear and front chambers $Rf$ and $Re$ as shown in FIG. 9. Thus, the ball receiver 24 is moved forwardly against the spring 37 by the pressure difference $\Delta P_2$ to move the ball 23 forwardly so that the rate of deceleration $g$ acting on the ball 23 is compensated as shown by a dotted line VII in FIG. 7. As a result, when the master cylinder pressure $Pm$ reaches the value $Pm_3$, the ball 23 is seated on the valve seat 26 to close the cut-off valve V. Other operations are as same as those in the normal braking operation and no repetition is made here.

Figure 7:
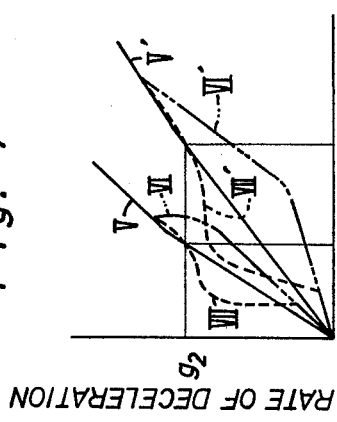
FIG. 7 is a graph showing a relation between the master cylinder pressure and the rate of deceleration acting on the ball assembled within the valve unit shown in FIG. 5.
Figure 8:
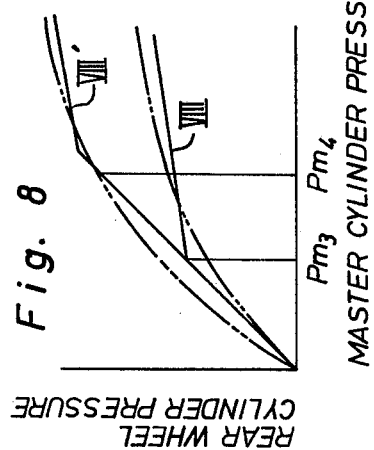
FIG. 8 is a graph showing the pressure controlling characteristics of the valve unit shown in FIG. 5.

Furthermore, the function of the inertia-controlled valve unit 20 under the loaded condition of the vehicle is substantially the same as those in the case when the vehicle is under the unloaded condition and will apparently be recognized when referred to a solid line V' and a dot-dash line VII' in FIG. 7 and also a solid line VIII' in FIG. 8. In FIGS. 7 and 8 reference character $Pm_4$ indicates a master cylinder pressure when the rate of deceleration $g$ of the ball 23 reaches the predetermined value $g_2$ while the vehicle is under the loaded condition.

In FIG. 10 there is a modification of the ball receiver 24 adapted to the above embodiment. In this figure, a ball receiver 240 is provided at its rear face with an annular seal member 240c to be engaged with the inner wall of the rear chamber $Rf$ in the above embodiment. In the case the ball receiver 240 is adapted to the above embodiment, particularly in emergent braking operation a large pressure difference is produced between the rear and front chambers $Rf$ and $Re$ which are communicated to each other through an orifice 240a provided on the center of the receiver 240. This provides sensitive movement of the receiver 240 to surely operate the ball 23.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. In a fluid pressure control device for a vehicle braking system incorporating between a master cylinder and rear wheel brake cylinders, which comprises a housing adapted to be fixedly mounted at an inclined angle on a vehicle body frame, said housing being provided thereon with an inlet port for connection to the master cylinder and an outlet port for connection to the rear wheel brake cylinders and provided therein with a valve chamber in communication with said inlet and outlet ports; a valve seat provided within said valve chamber to permit fluid flow therethrough; and an inertia-controlled ball disposed within said valve chamber for normally permitting fluid communication between said inlet and outlet ports through said valve seat but adapted to co-operate with said valve seat to cut-off the fluid communication when said ball is subjected to a deceleration in excess of a predetermined value;

the improvement comprising a movable element axially slidable within said valve chamber to subdivide said valve chamber into a first chamber including said ball therein and a second chamber in communication with said inlet port; said movable element being provided with an orifice to permit fluid communication between said first and second chambers such that, when fluid pressure in said second chamber increases at a rate in excess of a predetermined value, a pressure difference is produced between said first and second chambers to cause said movable element to move said ball to a position in which it engages said valve seat.

2. A fluid pressure control device as claimed in claim 1, wherein a stepped piston is slidably disposed within said housing to define said valve chamber at the smaller end thereof and a pressure chamber in communication with said outlet port at the larger end thereof and provided thereon with an axial passage connecting said valve chamber to said pressure chamber and wherein said valve seat is provided on the smaller end of said piston to co-operate with said ball within said first chamber.

3. A fluid pressure control device as claimed in claim 2, wherein a sleeve case is assembled within said valve chamber to receive said ball and said movable element therein, said first and second chambers being formed by said movable element within said sleeve case.

4. In a fluid pressure control device for a vehicle braking system incorporating between a master cylinder and rear wheel brake cylinders, which comprises a housing adapted to be fixedly mounted at an inclined angle on a vehicle body portion supported by a suspension system, said housing being provided thereon with an inlet port for connection to the master cylinder and an outlet port for connection to the rear wheel brake cylinders and provided therein with a valve chamber in communication with said inlet port; an inertia-controlled valve assembly including a valve seat provided within said valve chamber and an inertia-controlled ball disposed within said valve chamber to cooperate with said valve seat and rolling toward said valve seat when said ball is subjected to a deceleration in excess of a predetermined value; and means for controlling fluid communication between said inlet and outlet ports in response to opening and closing of said valve assembly;

the improvement wherein a movable element is axially slidably disposed within said valve chamber to subdivide said valve chamber into a first chamber receiving said ball therein and a second chamber in communication with said inlet port and provided thereon with an orifice to permit fluid communication between said first and second chambers such that, when fluid pressure in said second chamber increases at a rate in excess of a predetermined value, a pressure difference is produced between said first and second chambers to cause said movable element to move said ball to a position in which said valve assembly is closed.

5. In a fluid pressure control device for a vehicle braking system incorporating between a master cylinder and rear wheel brake cylinders, which comprises a housing adapted to be fixedly mounted at an inclined angle on a vehicle body frame, said housing being provided thereon with an inlet port for connection to the master cylinder and an outlet port for connection to the rear wheel brake cylinders and provided therein with a stepped bore in communication with said inlet and outlet ports; a stepped piston which is slidably disposed within said stepped bore to provide first and second chambers being in constant communication respectively with said inlet and outlet ports and which has piston surfaces providing first and second effective piston areas whereby opposing displacement forces may be provided on said piston respectively in the directions toward and away from said outlet port, the first effective piston area being smaller than the second one; a first valve part of said piston co-operable with a second valve part of the stepped bore wall for controlling intercommunication between said first and second chambers in dependence upon the position of said piston in said stepped bore; an assistant plunger slidably disposed within said stepped bore to provide a third chamber at one end thereof; a spring interposed between said stepped piston and said plunger for biasing said piston in the direction toward a normal position in which said first and second valve parts provide full communication between said first and second chambers; a valve chamber provided within said housing and connected at one end thereof to said first chamber and at the other end thereof to said third chamber; a valve seat provided within said valve chamber to permit fluid flow therethrough; and an inertia-controlled ball disposed within said valve chamber for normally permitting fluid communication between said first and third chambers through said valve seat but adapted to co-operate with said valve seat to cut-off the fluid communication when said ball is subjected to a deceleration in excess of a predetermined value;

the improvement comprising a ball receiver slidably disposed within said valve chamber to subdivide said valve chamber into a fourth chamber including said ball therein and a fifth chamber in communication with said first chamber; and an orifice provided on said receiver to permit fluid communication between said fourth and fifth chambers therethrough; whereby in rapid operation of the master cylinder a pressure difference is produced between said fourth and fifth chambers due to said orifice to move said receiver toward said valve seat so as to engage said ball with said valve seat.

6. A fluid pressure control device as claimed in claim 5, wherein said ball receiver is provided with a plurality of guide arms to receive said ball thereon.

7. A fluid pressure control device as claimed in claim 6, wherein a spring is interposed between a portion of said ball receiver and the inner wall of said valve chamber to bias said receiver toward a normal position in which said ball is separated from said valve seat.

* * * * *